Patented July 23, 1946

2,404,700

UNITED STATES PATENT OFFICE 2,404,700

MANUFACTURE OF VINYL ETHERS

William John Roy Evans, Blackley, Manchester, England, assignor to Imperial Chemical Industries Limited, a corporation of Great Britain No Drawing. Application January 2, 1945, Serial No. 571,121. In Great Britain November 25, 1943

4 Claims. (Cl. 260—345)

This invention relates to improvements in the manufacture of vinyl ethers, more particularly to improvements in the manufacture of vinyl ethers from actylene and alcohols.

It is known that vinyl ethers may be obtained by reacting acetylene and alcohols in the presence of basic substances which act as catalysts during the reaction, for example, potassium alkoxides. However, such processes usually require the use of high pressures and are accompanied by the hazards necessarily associated with the use of acetylene at high pressures.

It has been proposed to make vinyl ethers from acetylene and alcohols at ordinary pressures by interacting them in the presence of basic substances, for example, potassium alkoxides, and in the presence of liquids, for example liquid paraffin, which boil at temperatures higher than the reaction temperature. Although working in accordance with this proposal obviates the hazards involved in using acetylene at high pressures, experiments show that, under such conditions, the life of the catalyst is short.

It has now been found that, when vinyl ethers are made by reacting acetylene and alcohols at ordinary pressures with a potassium alkoxide as the catalyst, the use of secondary or tertiary aromatic amines as high boiling media for the reaction greatly lengthens the life of the catalyst and also appreciably enhances its activity.

Thus, according to the present invention there is provided a process for the manufacture of vinyl ethers excluding the n-butyl ether, the preparation of which by this same process is the subject of Serial No. 562,736, filed November 9, 1944, which comprises bringing acetylene and an alcohol into contact with a potassium alkoxide dissolved or suspended in a medium consisting solely or mainly of a secondary or tertiary aromatic amine at a pressure not substantially greater than atmospheric and at a temperature of about 150–250° C.

As alcohols which may be used in the production of vinyl ethers in accordance with the process of this invention there may be mentioned methyl, ethyl, propyl, isopropyl, isobutyl, tert.-butyl and tetrahydrofurfuryl alcohols.

As secondary or tertiary aromatic amines there may be used, for example, methylaniline, dimethylaniline, ethylaniline, diethylaniline, diethyl-o- and p-toluidines, benzylaniline, dibenzyline and benzylethylaniline.

As catalysts it is preferred to use the potassium alkoxide prepared from the alcohol which is to be converted into the ether.

Preferably an antioxidant, for example, diphenyl-p-phenylenediamine, is included with the reagents.

In a convenient way of operating the process of the invention the alkoxide dissolved in some of the alcohol which is to be converted into the ether is added to a large proportion of the secondary or tertiary amine. The mixture is heated in a reaction vessel for example, at 150–180° C. under conditions such that the presence of oxygen is avoided, as by passing a stream of an inert gas such as nitrogen through the liquid. Acetylene gas and the alcohol in vapour form are then passed through the liquid, for example, at a pressure of 2–5 lbs. per square inch, the liquid preferably being maintained at about 170–190° C. The issuing vapours are fractionated and condensed, and the ether, which is in the condensate, is collected and, if desired, purified by conventional means.

The invention is illustrated but not limited by the following examples, in which the parts are expressed by weight.

Example 1

5.5 parts of potassium are dissolved in 32 parts of isobutyl alcohol and 38 parts of ethylaniline in presence of 1.1 parts of diphenyl-p-phenylenediamine. This solution is transferred to a reaction tower, which is fitted with a fractionating column with dephlegmator control and a means of condensing vapours which pass through the column, containing 1155 parts of dried ethylaniline at a temperature of 160° C. through which a stream of dry nitrogen is passing.

The medium is then heated at 178–182° C. and the nitrogen flow reduced gradually to zero whilst a mixture of acetylene at 35 parts per hour and isobutyl alcohol at 160 parts per hour, preheated to 180–190° C. is fed at a pressure just greater than atmospheric into the base of the tower through a gas distributor. A mixture of vinyl isobutyl ether, isobutyl alcohol and acetylene passes from the top of the tower to the base of a fractionating column. The isobutyl alcohol returns to the reaction tower while the azeotropic mixture of vinyl isobutyl ether and isobutyl alcohol passes out of the head of the column and is condensed and collected. The ether is purified by distilling over sodium, and a material of excellent purity is obtained. The production of ether initially is 90 parts per hour and falls gradually to 30 parts per hour after 13 hours. A total of 849 parts of the vinyl isobutyl ether is obtained during 13 hours.

The spent catalyst separates from solution; it may be withdrawn from the bottom of the tower and replaced with fresh catalyst solution, thus enabling the process to be operated continuously.

Example 2

A 5-litre flask is fitted with a high speed (2000 R. P. M.) centrifugal gas-dispersing stirrer, below which is a jet through which nitrogen or acetylene and alcohol vapour can be fed. 2 litres of diethylaniline are put into the flask, which is then closed and fitted with a short stripping column to reflux diethylaniline from the effluent vapours. The flask is surrounded by an electrically heated jacket and the contents are heated to 160–170° C. while passing nitrogen through to displace air and dry the diethylaniline.

Catalyst solution, comprising 7.8 gm. of potassium dissolved in 70 gm. of isobutyl alcohol, 1.0 gm. of diphenyl-p-phenylenediamine and 50 gm. of diethylaniline is then added under nitrogen. The excess of isobutyl alcohol, which distils off is removed at the foot of the stripping column. The temperature is then raised to 185–190° C. and kept there with the nitrogen shut off, while acetylene and isobutyl alcohol are fed in, at such a rate that the column head temperature is between 65–75° C. Vinyl isobutyl ether of 90–98% strength distils off, and is condensed and collected. The rate of production is initially about 94 gm./hr., and is still 86 gm./hr. after 9 hr., the equivalent of 724 gm. of 100% pure vinyl isobutyl ether having then been obtained. The experiment is then discontinued. Next day on restarting similarly, adding further catalyst made from 8.4 gm. potassium, production proceeds at 115–120 gm./hr. and continues with product decrease to 74 gm./hr., during which time 2060 gm. of ether are obtained. Thus a total of 2784 gm. is obtained from 16.2 g. potassium i. e. 170 gm. per gm. of potassium, and the catalyst is still active.

Example 3

1490 gm. of diethylaniline are put into a 5-litre flask and dried by passing dry nitrogen through at 160° C. 5.5 gm. of potassium are dissolved in 31.5 gm. of tetrahydrofurfuryl alcohol and 50 gm. of diethylaniline under nitrogen, and the hot solution is transferred to the 5-litre flask in absence of air and moisture. The mixture is then heated to 180–190° C., while dry acetylene and dry tetrahydrofurfuryl alcohol are passed through with vigorous agitation. The reaction vessel is fitted with a short stripping column, which returns diethylaniline but passes on the alcohol and acetylene excess, together with the vinyl tetrahydrofurfuryl ether formed. Tetrahydrofurfuryl alcohol is then fed at such a rate that the column head temperature is about 146° C., and acetylene is fed at about 0.4 cu. ft./hr., and the crude ether/alcohol mixture is removed continuously. Fractionation of the product followed by distillation over sodium yields practically pure vinyl tetrahydrofurfuryl ether, B. P. 161–162°/759 mm.

Treatment of 100 parts of a sample of the ether with 1 part of stannic chloride dissolved in 8 parts of petrol results in almost instantaneous polymerisation to a viscous syrup.

Treatment with boron trifluoride/acetic acid complex at minus 40° C. gives a colourless tacky solid polymer.

Example 4

Working in a stirred vessel as in Example 1, potassium ethoxide in diethylaniline is used to catalyse addition of ethyl alcohol (industrial absolute alcohol dried by azeotropic distillation with benzene) to acetylene. The reaction proceeds at 160–165°, and a column head temperature of 37° to 44° is maintained by adjusting the alcohol feed rate. Vinyl ethyl ether of 60% strength or higher is obtained according to the control exercised, and may be purified by fractional distillation, washing with water, and drying.

Example 5

Vinyl methyl ether can be obtained from methyl alcohol by a process similar to the foregoing. Benzylethylaniline is a suitable amine and with this a reaction temperature of 280–250 is used. The ether has a low boiling point and the receiver must be suitably cooled.

I claim:

1. A process for the production of vinyl ethers which comprises passing acetylene and an alcohol taken from the group consisting of methyl, ethyl, propyl, isopropyl, isobutyl, tertiary butyl, and tetrahydrofurfuryl alcohols into a liquid reaction medium taken from the group consisting of secondary and tertiary aromatic amines containing the potassium alkoxide corresponding to the alcohol passed into the composition, at a temperature of 150° C. to 200° C.

2. A process for the production of vinyl ethers which comprises passing, in the vapor phase, acetylene and an alcohol taken from the group consisting of methyl, ethyl, propyl, isopropyl, isobutyl, tertiary butyl, and tetrahydrofurfuryl alcohols into a liquid reaction medium taken from the group consisting of secondary and tertiary aromatic amines containing the potassium alkoxide corresponding to the alcohol passed into the composition, at a temperature of 150° C. to 200° C.

3. A process for the production of vinyl ethers which comprises passing, in the vapor phase, acetylene and an alcohol taken from the group consisting of methyl, ethyl, propyl, isopropyl, isobutyl, tertiary butyl, and tetrahydrofurfuryl alcohols, together with diphenyl-p-phenylenediamine as an antioxidant, into a liquid reaction medium taken from the group consisting of secondary and tertiary aromatic amines containing the potassium alkoxide corresponding to the alcohol passed into the composition, at a temperature of 150° C. to 200° C.

4. A process for the production of vinyl ethers which comprises passing nitrogen through a composition comprising an alcohol taken from the group consisting of methyl, ethyl, propyl, isopropyl, isobutyl, tertiary butyl, and tetrahydrofurfuryl alcohols, a potassium alkoxide corresponding to the alcohol present in the composition, and a liquid reaction medium taken from the group consisting of secondary and tertiary aromatic amines, at a temperature of 150° C. to 180° C., then passing a mixture of acetylene and the said alcohol, in the vapor phase, through said mixture at a temperature between 150° C. and 250° C.

WILLIAM JOHN ROY EVANS.